US010364041B2

(12) United States Patent
Kupratis et al.

(10) Patent No.: US 10,364,041 B2
(45) Date of Patent: Jul. 30, 2019

(54) TWIN CENTRIFUGAL SINGLE SPOOL ENGINE

(71) Applicant: United Technologies Corporation, Farmington, CT (US)

(72) Inventors: Daniel Bernard Kupratis, Wallingford, CT (US); Arthur W. Utay, South Windsor, CT (US); Tania Bhatia Kashyap, West Hartford, CT (US); Thomas N. Slavens, Moodus, CT (US); Kevin L. Rugg, Fairfield, CT (US); Mark F. Zelesky, Bolton, CT (US); Brian D. Merry, Andover, CT (US); Gabriel L. Suciu, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 609 days.

(21) Appl. No.: 15/218,915

(22) Filed: Jul. 25, 2016

(65) Prior Publication Data
US 2018/0023576 A1    Jan. 25, 2018

(51) Int. Cl.
*B64D 41/00*    (2006.01)
*F04D 17/10*    (2006.01)
*F02C 3/08*    (2006.01)
*F02C 3/14*    (2006.01)

(52) U.S. Cl.
CPC ........... *B64D 41/00* (2013.01); *F04D 17/105* (2013.01); *F02C 3/08* (2013.01); *F02C 3/145* (2013.01)

(58) Field of Classification Search
CPC ......... B64D 41/00; F04D 17/105; F04D 1/10; F04D 15/0072; F04D 17/14; F04D 15/029; F04D 19/028; F02C 3/145
See application file for complete search history.

(56) References Cited

U.S. PATENT DOCUMENTS

| 2,760,719 | A | * | 8/1956 | Wood | F04D 17/105 |
| | | | | | 415/121.2 |
| 6,942,181 | B2 | * | 9/2005 | Dionne | B64D 33/08 |
| | | | | | 244/57 |
| 7,628,018 | B2 | * | 12/2009 | Mowill | F01D 5/043 |
| | | | | | 415/102 |
| 9,752,585 | B2 | * | 9/2017 | Kupratis | F04D 17/12 |
| 2002/0108376 | A1 | * | 8/2002 | Stevens | F02C 7/141 |
| | | | | | 60/772 |
| 2009/0232676 | A1 | * | 9/2009 | Mowill | F01D 5/043 |
| | | | | | 417/409 |
| 2014/0271121 | A1 | * | 9/2014 | Kupratis | F04D 17/12 |
| | | | | | 415/1 |
| 2016/0201686 | A1 | * | 7/2016 | Vogt | F04D 17/105 |
| | | | | | 417/423.7 |

* cited by examiner

*Primary Examiner* — Eldon T Brockman
(74) *Attorney, Agent, or Firm* — Snell & Wilmer, L.L.P.

(57) ABSTRACT

An auxiliary power unit may comprise a twin centrifugal compressor including a first blade. A turbine may be disposed aft of the twin centrifugal compressor. The turbine may include a second blade. The first blade comprises a first material and the second blade comprises a second material. The first material may the same as the second material. The twin centrifugal compressor may include forward centrifugal compressor and an aft centrifugal compressor disposed aft of the forward centrifugal compressor.

17 Claims, 4 Drawing Sheets

TWIN CENTRIFUGAL SINGLE SPOOL ENGINE

FIELD

The present disclosure relates to gas turbine engines, and, more specifically, to a compressor and turbine for a gas turbine auxiliary power unit.

BACKGROUND

An auxiliary power unit (APU) on an aircraft may be a gas turbine engine configured to produce electrical and pneumatic power. The APU may provide power to aircraft systems to either supplement or substitute power generated by the main engines. An APU may be a small gas turbine engine that is mounted within the aircraft fuselage and which draws air through inlets defined within the outer skin of the aircraft. APU may also be used to power aircraft such as unmanned drones or ballistic missiles.

A gas turbine engine typically includes a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

SUMMARY

An auxiliary power unit is described herein, in accordance with various embodiments. A twin centrifugal compressor for an auxiliary power unit may comprise a first airflow path at an input of the twin centrifugal compressor. A second airflow path and a third airflow path may be defined by the twin centrifugal compressor. The second airflow path and the third airflow path may be split from the first airflow path.

In various embodiments, the twin centrifugal compressor may further comprise a blade. The blade may comprise silicon nitride. The second airflow path and the third airflow path may be co-axial within the twin centrifugal compressor. A pressure of the second airflow path may be substantially the same as a pressure of the third airflow path. A pressure ratio of at least one of the second airflow path or the third airflow path to the first airflow path may be 7:1 or greater. A manifold may define a fourth airflow path. The fourth airflow path may be comprised of a mix of the second airflow path and the third airflow path.

A compressor section of an auxiliary power unit is also provided. The compressor section may comprise a forward centrifugal compressor and an aft centrifugal compressor disposed aft of the forward centrifugal compressor.

In various embodiments, the forward centrifugal compressor may further comprise a blade. The blade may include silicon nitride. A diameter of the forward centrifugal compressor may be smaller than a diameter of the aft centrifugal compressor. A first airflow path may be defined within the compressor section. The forward centrifugal compressor may define a second airflow path. The aft centrifugal compressor may define a third airflow path. The second airflow path and the third airflow path may be split from the first airflow path. The second airflow path and the third airflow path may be co-axial. A pressure of the second airflow path may be substantially the same as a pressure of the third airflow path. The compressor section may comprise a manifold. The manifold may define a fourth airflow path, wherein the fourth airflow path is comprised of a mix of the second airflow path and the third airflow path.

An auxiliary power unit is also provided. The auxiliary power unit may comprise a twin centrifugal compressor including a first blade. A turbine may be disposed aft of the twin centrifugal compressor. The turbine may include a second blade.

In various embodiments, the first blade may comprise a first material and the second blade may comprise a second material. The first material may be the same as the second material. The first blade may comprise silicon nitride. The auxiliary power unit may comprise an engine case structure. The engine case structure and the twin centrifugal compressor may define a first airflow path. The twin centrifugal compressor may define a second airflow path and a third airflow path from the first airflow path. A fourth airflow path may be at an input of the turbine. A temperature of the fourth airflow path may be 2300° F. (1260° C.) or greater. A diameter of the turbine may be between 15.24 cm (6 inches) to 17.78 cm (7 inches).

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of a gas turbine engine. As used herein, "forward" refers to the direction associated with the intake (e.g., the front end) of a gas turbine engine. The term "upstream" is used to refer to directions and positions located closer to the source than directions and positions referenced as "downstream."

Figure 1A:
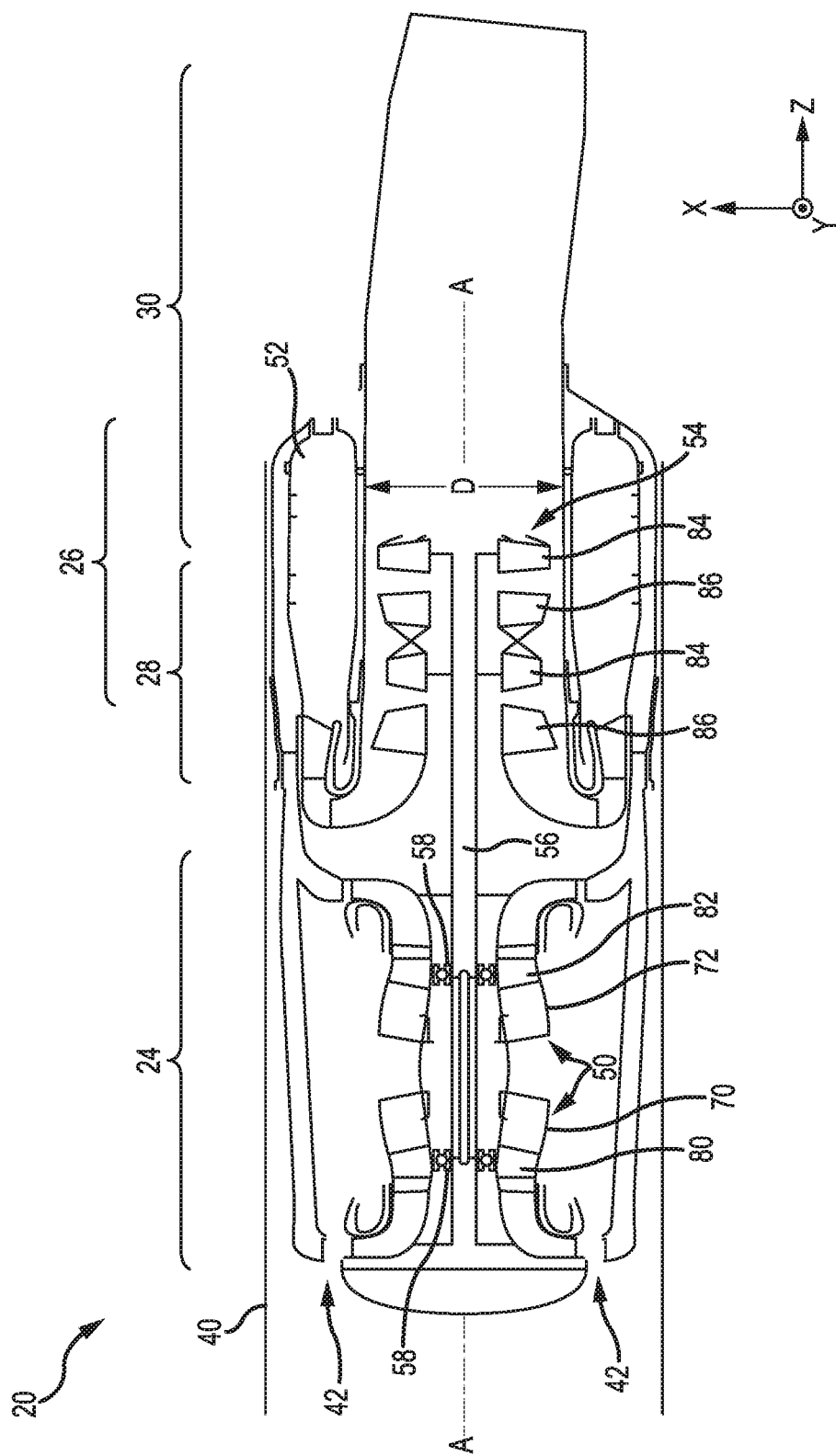
FIG. 1A illustrates a cross-sectional schematic view of an auxiliary power unit, in accordance with various embodiments.
Figure 1B:
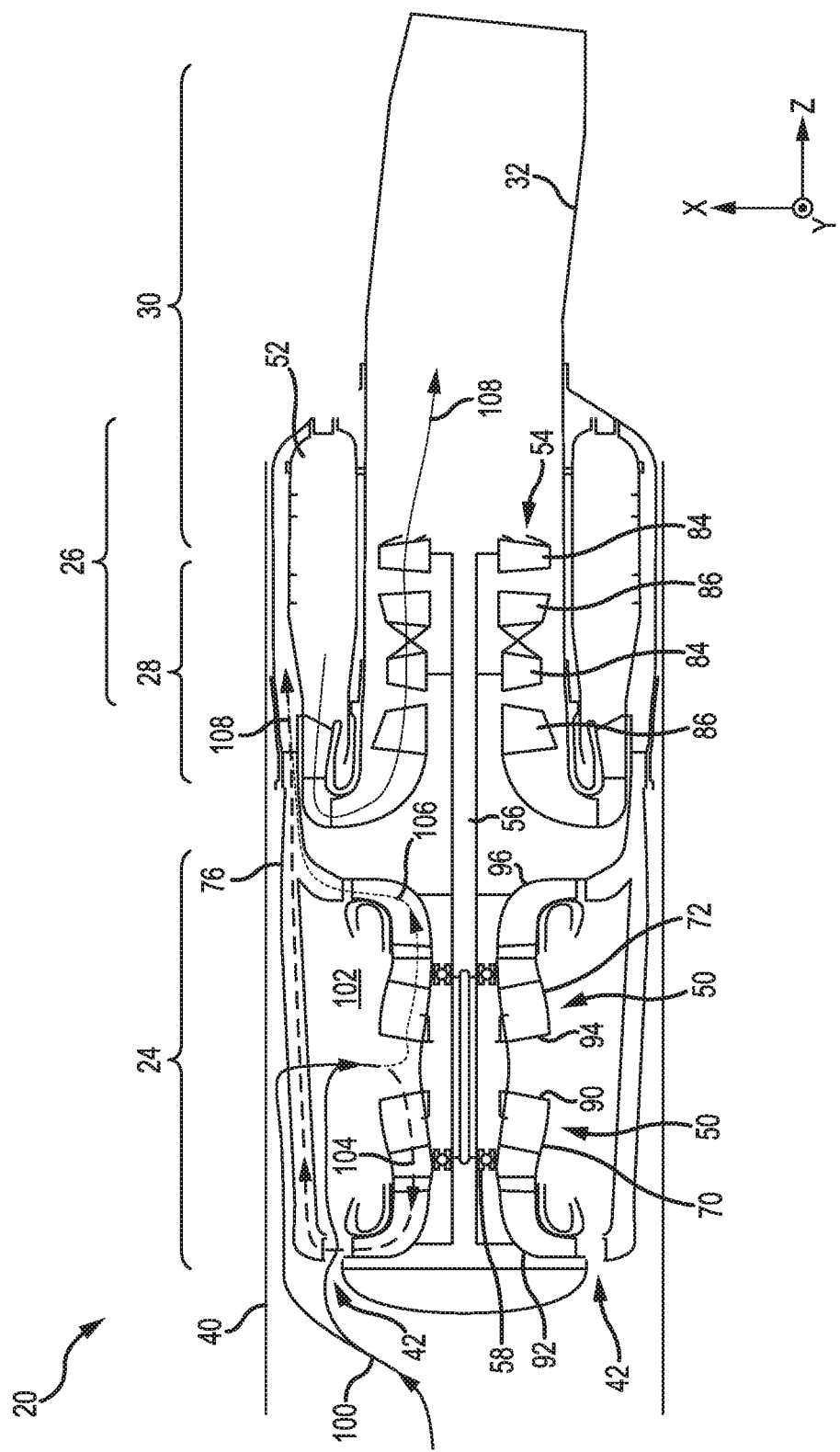
FIG. 1B illustrates a cross-sectional schematic view of an auxiliary power unit, in accordance with various embodiments.

With reference to FIGS. 1A-1B, an auxiliary power unit (APU) 20 is shown in accordance with various embodiments. The various components of APU 20 are shown in a particular configuration for clarity, however other configurations are possible in other embodiments. The present disclosure is applicable to other types of turbine engines, such as, turboshaft units, and turboprop units. APU 20 may comprise a single-spool turbojet that may generally incorporate a compressor section 24, a combustor section 26, a turbine section 28, and an exhaust duct section 30. Although depicted as a single-spool turbojet, in the non-limiting embodiment of FIGS. 1A-1B, it should be understood that the concepts described herein are applicable to other gas turbine engines including augmented engines, non-augmented engines, geared architecture engines, direct drive turbofans, low-bypass turbofan, high-bypass turbofans, turbojets, turboshafts, multi-stream variable cycle adaptive engines, two-spool architectures, three-spool architectures, and other engine architectures. A gas turbine engine may comprise a turbojet, an industrial gas turbine (IGT) or a geared aircraft engine, such as a geared turbofan, or non-geared aircraft engine, such as a turbofan, or may comprise any gas turbine engine as desired.

Referring now to FIG. 1A, APU 20 is shown, in accordance with various embodiments. Various case structures and modules may define an engine case structure 40 which defines an exoskeleton to support the rotational hardware. Air is drawn through intake 42 at a forward end of APU 20. APU 20 may include a twin centrifugal compressor 50 (also referred to as a twin impeller) for pressurizing incoming air from intake 42. A combustor 52 may be disposed aft of twin centrifugal compressor 50. The twin centrifugal compressor 50 may direct compressed air towards the combustor 52. The compressed air may be mixed with fuel and ignited in the combustor 52, generating an annular stream of hot combustion gases. A turbine 54 may be downstream of the combustor 52 and may also be mechanically coupled to twin centrifugal compressor 50 through a shaft 56. Turbine 54 may extract energy from the combusted gases exiting the combustor 52.

Various components of APU 20 may rotate about an axis of rotation, engine central longitudinal axis A-A. APU 20 may include a rotor system, which may include twin centrifugal compressor 50 and turbine 54 coupled by shaft 56. APU 20 may generally comprise twin centrifugal compressor 50 and turbine 54 mounted bearing systems 58 for rotation about engine central longitudinal axis A-A relative to engine case structure 40. It should be understood that various bearing systems 58 at various locations may be provided. In various embodiments, compressor section 24 and turbine section 28 may include a rotor-stator assembly comprising one or more stages or sets of rotating blades ("blades") and one or more stages or sets of stationary vanes ("vanes") axially interspersed with the associated blade stages but non-rotating about engine central longitudinal axis A-A. Unless otherwise indicated, the term "stage" may refer to a fan stage, a compressor stage, and/or a turbine stage. The blade stages of twin centrifugal compressor 50 and turbine 54 may at least partially form a high pressure spool. Various further embodiments may include a low pressure compressor driven by low pressure turbine as part of the low speed spool. As used herein, a "high pressure" compressor or turbine experiences a higher pressure than a corresponding "low pressure" compressor or turbine.

In various embodiments, twin centrifugal compressor 50 may include a first centrifugal compressor, such as a forward centrifugal compressor 70, and a second centrifugal compressor, such as an aft centrifugal compressor 72. A diameter of forward centrifugal compressor 70 may be smaller than a diameter of aft centrifugal compressor 72. A diameter of forward centrifugal compressor 70 may be the same as or similar to a diameter of aft centrifugal compressor 72. Forward centrifugal compressor 70 may comprise a plurality of rotating blades 80 and aft centrifugal compressor 72 may comprise a plurality of rotating blades 82. Blades 80, 82 may each be coupled to a disk, which may be configured to rotate about engine central longitudinal axis A-A. Each disk may be centered on the rotation axis of the gas turbine engine with a plurality of blades 80, 82 attached to a disk and spaced apart in the circumferential or tangential direction. Blades 80, 82 may rotate with shaft 56 about bearing system 58. Vanes, among other stationary components, may be configured to guide and/or adjust airflow between adjacent blades 80, 82 within their respective compressor. In various embodiments, vanes may increase pressure in twin centrifugal compressor 50 and direct air flow. In various embodiments, blades 80, 82 of twin centrifugal compressor 50 may comprise a heat tolerant material, such as a ceramic. Blades 80, 82 may include silicon nitride, silicon carbide, silicon dioxide, alumina or other material with desired material properties, such as at tolerance, strength, weight and density.

Turbine 54 may comprise one or more blades 84 and one or more vanes 86. Blades 84 may each be coupled to a disk, which may be configured to rotate about engine central longitudinal axis A-A. Each disk may be centered on the rotation axis of the gas turbine engine with a plurality of blades 84 attached to a disk and spaced apart in the circumferential or tangential direction. Blades 84 may rotate with shaft 56 about bearing system 58. Vanes 86, among other stationary components, may be configured to guide and/or adjust airflow between adjacent blades 84. In various embodiments, turbine 54 may include a plurality of blades 84 and vanes 86, and more specifically, turbine 54 may include two blades 84 and two vanes 86. Blades 84 of turbine 54 may comprise a heat tolerant material, such as a ceramic. In various embodiments, blades 84 may include silicon nitride, silicon carbide, silicon dioxide, alumina or other material with desired material properties, such as heat tolerance, strength, weight and density.

In various embodiments, blades 84 of turbine 54 may comprise similar materials or the same materials as blades 80, 82 of twin centrifugal compressor 50. Thus, blades 84 of turbine 54 and blades 80, 82 of twin centrifugal compressor 50 may have similar coefficients of thermal expansion.

Blades 84 of turbine 54 and blades 80, 82 of twin centrifugal compressor 50 coupled by shaft 56 may spin at the same rate. By constructing blades 84 and blades 80, 82 of the same material, thermal stresses in twin centrifugal compressor 50 and turbine 54 may be controlled. In various embodiments, blades 84 of turbine 54 and blades 80, 82 of twin centrifugal compressor 50 are comprised of, for example, silicon nitride. Silicon nitride provides greater thermal resistance for smaller blades operating at higher speeds. In various embodiments, turbine 54 may operate at temperatures of 2300° F. (1260° C.) or greater, and more specifically, at temperatures of 2400° F. (1316° C.) or greater. In various embodiments, turbine 54 may include a diameter D of about 16.51 centimeters (cm) (6.5 inches), wherein "about" in this context only means+/−0.50 cm. Diameter D of turbine 54 may be between 10 cm (3.94 inches) to 20.32 cm (8 inches), and further between 15.24 cm (6 inches) to 17.78 cm (7 inches), and further between 15.24 cm (6 inches) to 16.51 cm (6.5 inches). Diameter D of turbine 54 may be between 10 cm (3.94 inches) to 18 cm (7.09 inches).

With reference to FIG. 1B, an airflow path for APU 20 is shown, in accordance with various embodiments. A first airflow path 100 may flow through intake 42 and into compressor section 24. Engine case structure 40 is spaced radially outward from twin centrifugal compressor 50 to define an intake plenum 102 and the first airflow path 100 within compressor section 24. Twin centrifugal compressor 50 may be disposed radially inward from intake plenum 102 and first airflow path 100. Intake plenum 102 receives airflow from first airflow path 100 for communication into the forward centrifugal compressor 70 and the aft centrifugal compressor 72. That is, the forward centrifugal compressor 70 and the aft centrifugal compressor 72 are located respectively at the forward end and the aft end of intake plenum 102 to provide an equal split of airflow into centrifugal compressors 70, 72. First airflow path 100 flows radially inward from intake plenum 102 and into centrifugal compressors 70, 72. First airflow path 100 splits into second airflow path 104 and third airflow path 106, wherein forward centrifugal compressor 70 receives second airflow path 104 and aft centrifugal compressor 72 receives third airflow path 106. Thus, twin centrifugal compressor 50 defines second airflow path 104 and a third airflow path 106 from the first airflow path 100, wherein first airflow path 100 at the input of twin centrifugal compressor 50 is split by twin centrifugal compressor 50 into airflow paths 104, 106.

Forward centrifugal compressor 70 includes an aft end 90 and a forward end 92, with forward end 92 being disposed downstream from aft end 90. Forward centrifugal compressor 70 receives second airflow path 104 from intake plenum 102 at aft end 90 of forward centrifugal compressor 70. Aft centrifugal compressor 72 includes a forward end 94 and an aft end 96, aft end 96 being disposed downstream from forward end 94. Aft centrifugal compressor 72 receives third airflow path 106 from intake plenum 102 at forward end 94 of aft centrifugal compressor 72. In various embodiments, second airflow path 104 and third airflow path 106 may flow axially through centrifugal compressors 70, 72 in generally the z direction, wherein the direction of third airflow path 106 through aft centrifugal compressor 72 may be in an opposite direction, with respect to the z axis, to second airflow path 104 through forward centrifugal compressor 70. Second airflow path 104 may flow in an axially forward direction through forward centrifugal compressor 70. Third airflow path 106 may flow in an axially aft direction through aft centrifugal compressor 72. In various embodiments, third airflow path 106 through aft centrifugal compressor 72 may be generally parallel or co-axial with second airflow path 104 through forward centrifugal compressor 70.

Twin centrifugal compressor 50 may include a manifold 76 for receiving pressurized airflow from forward centrifugal compressor 70 and aft centrifugal compressor 72 and directing the airflow into combustor 52. Manifold 76 may define fourth airflow path 108. Fourth airflow path 108 may be comprised of a mix of the second airflow path 104 and the third airflow path 106. Combustor 52 may receive a mixed airflow from centrifugal compressors 70, 72. The mixed airflow of fourth airflow path 108 may be mixed and burned with fuel in the combustor 52. Fourth airflow path 108 may be an axial flowpath and may flow in generally the z direction. In various embodiments, fourth airflow path 108 may be generally parallel or co-axial with second airflow path 104 and third airflow path 106. In various embodiments, a pressure of the second airflow path 104 may be substantially the same as a pressure of the third airflow path 106, wherein "substantially the same" in this context only means within +/−10% of a pressure.

Each of the forward centrifugal compressor 70 and the aft centrifugal compressor 72 compresses its respective airflow paths 104, 106 to similar pressure ratios. In various embodiments, twin centrifugal compressor 50 may be configured to provide a pressure ratio of 7:1 or greater. A pressure ratio of twin centrifugal compressor 50 may be a ratio of an output pressure, such as a pressure of airflow paths 104, 106, to an input pressure, such as a pressure of first airflow path 100. A pressure ratio of second airflow path 104 to first airflow path 100 may be 7:1 or greater, and a pressure ratio of third airflow path 106 to first airflow path 100 may also be 7:1 or greater. By comparison to a single conventional compressor that may compress the full airflow, such as first airflow path 100, the twin centrifugal compressor 50 may have a greater pressure ratio than a single conventional compressor. Each of the forward centrifugal compressor 70 and the aft centrifugal compressor 72 may be sized for one-half of a volume of first airflow path 100, and may have substantially the same pressure ratio, wherein "substantially the same" in this context only means within +/−10% of a pressure ratio. That is, twin centrifugal compressor 50 may provide, for example, a shaft speed that is faster than a single conventional compressor. The increased shaft speed of twin centrifugal compressor 50 results in greater compressor efficiency compared to the slower shaft speed of the single conventional compressor.

The hot combustion gases flow from combustor 52 through the turbine 54, which extracts energy from the hot combustion gases to power the twin centrifugal compressor 50. Exhaust section 30 may include an exhaust nozzle 32, and wherein fourth airflow path 108 passes from turbine 54 to exhaust nozzle 32.

Figure 2A:
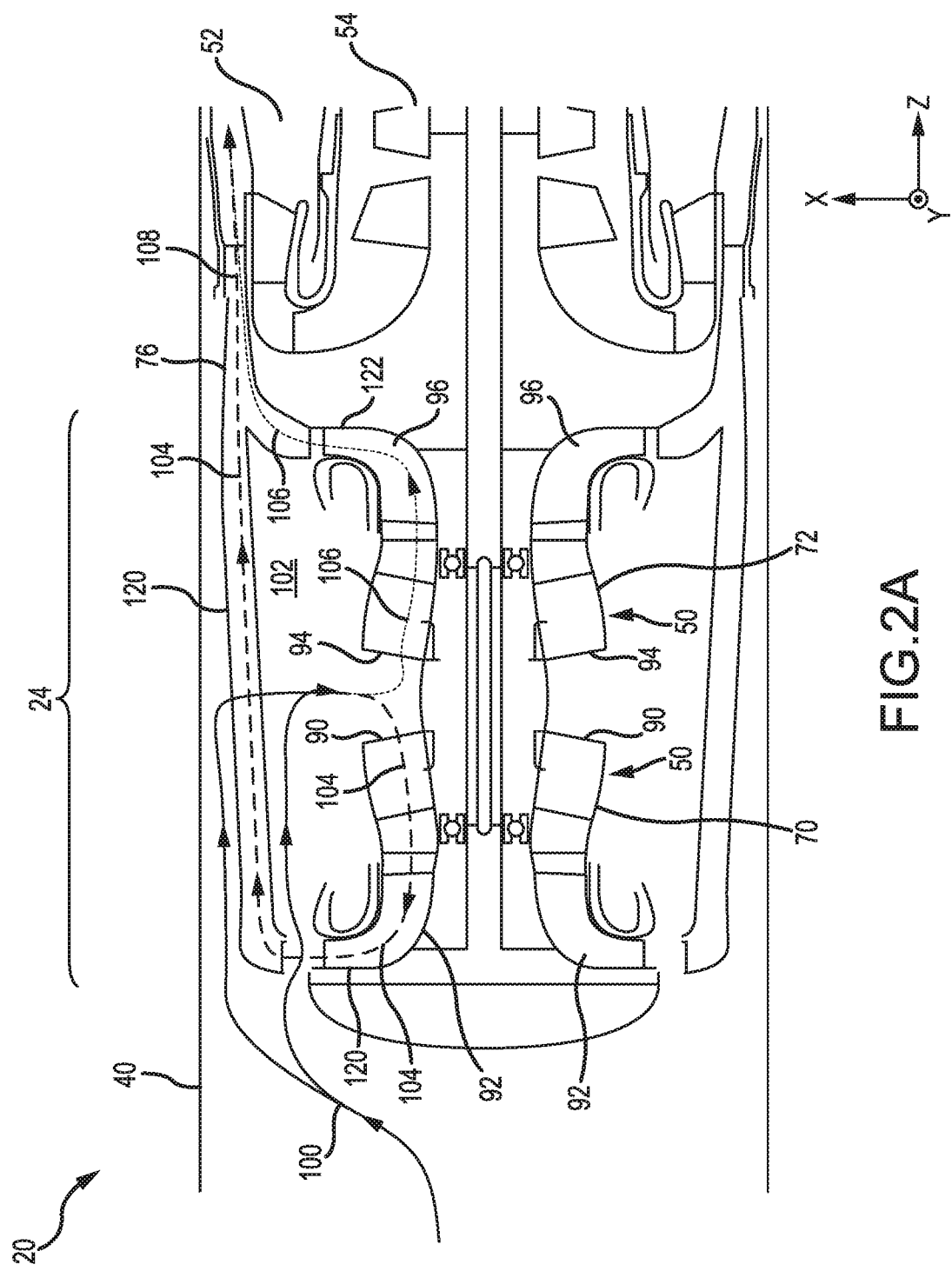
FIG. 2A illustrates an airflow path for an auxiliary power unit, in accordance with various embodiments.

With reference to FIG. 2A, additional detail of an airflow path of twin centrifugal compressor 50 for APU 20 is shown, in accordance with various embodiments. Manifold 76 of twin centrifugal compressor 50 may include a plurality of ducts, such as first duct 120 and second duct 122, for directing airflow from twin centrifugal compressor 50. First airflow path 100 may flow around first duct 120 and enter intake plenum 102. Within compressor section 24, first airflow path 100 may split or divide into second airflow path 104 and third airflow path 106. Second airflow path 104 may enter forward centrifugal compressor 70 at aft end 90. Third airflow path 106 may enter aft centrifugal compressor 72 at forward end 94. Manifold 76 may direct second airflow path 104 and third airflow path 106 after exiting centrifugal compressors 70,72 and combine airflow path 104, 106 into fourth airflow path 108, which may be a mixed airflow path.

A first duct 120 may be coupled to forward centrifugal compressor 70 to receive pressurized airflow from forward centrifugal compressor 70 and to direct second airflow path 104 to combustor 52. First duct 120 may extend radially outward, in the x direction on the provided xyz axis, from forward end 92 of forward centrifugal compressor 70. First duct 120 may bend or turn approximately 90 degrees to extend axially aft from forward end 92 in generally the z direction. Second airflow path 104 may flow axially forward through forward centrifugal compressor 70 into first duct 120 and may flow radially outward through first duct 120, and subsequently, may flow axially aft through first duct 120.

A second duct 122 may be coupled to aft centrifugal compressor 72 to receive pressurized airflow from aft centrifugal compressor 72 and to direct third airflow path 106 to combustor 52. Second duct 122 may extend radially outward, in the x direction on the provided xyz axis, from aft end 96 of aft centrifugal compressor 72. Second duct 122 may bend or turn approximately 90 degrees to extend axially aft to direct third airflow path 106 in generally the z direction. Third airflow path 106 may flow axially aft through aft centrifugal compressor 72 into second duct 122 and may flow radially outward through second duct 122, and subsequently, may flow axially aft through second duct 122.

In various embodiments, forward centrifugal compressor 70 and aft centrifugal compressor 72 may be configured to rotate about shaft 56 via bearing system 58. Bearing system 58 may include a ball bearing, trust bearing, foil bearing, roller bearing, air bearing or other bearing or combination thereof. Bearing system 58 may be used to balance the twin centrifugal compressor 50 with the thrust from turbine 54.

Figure 2B:
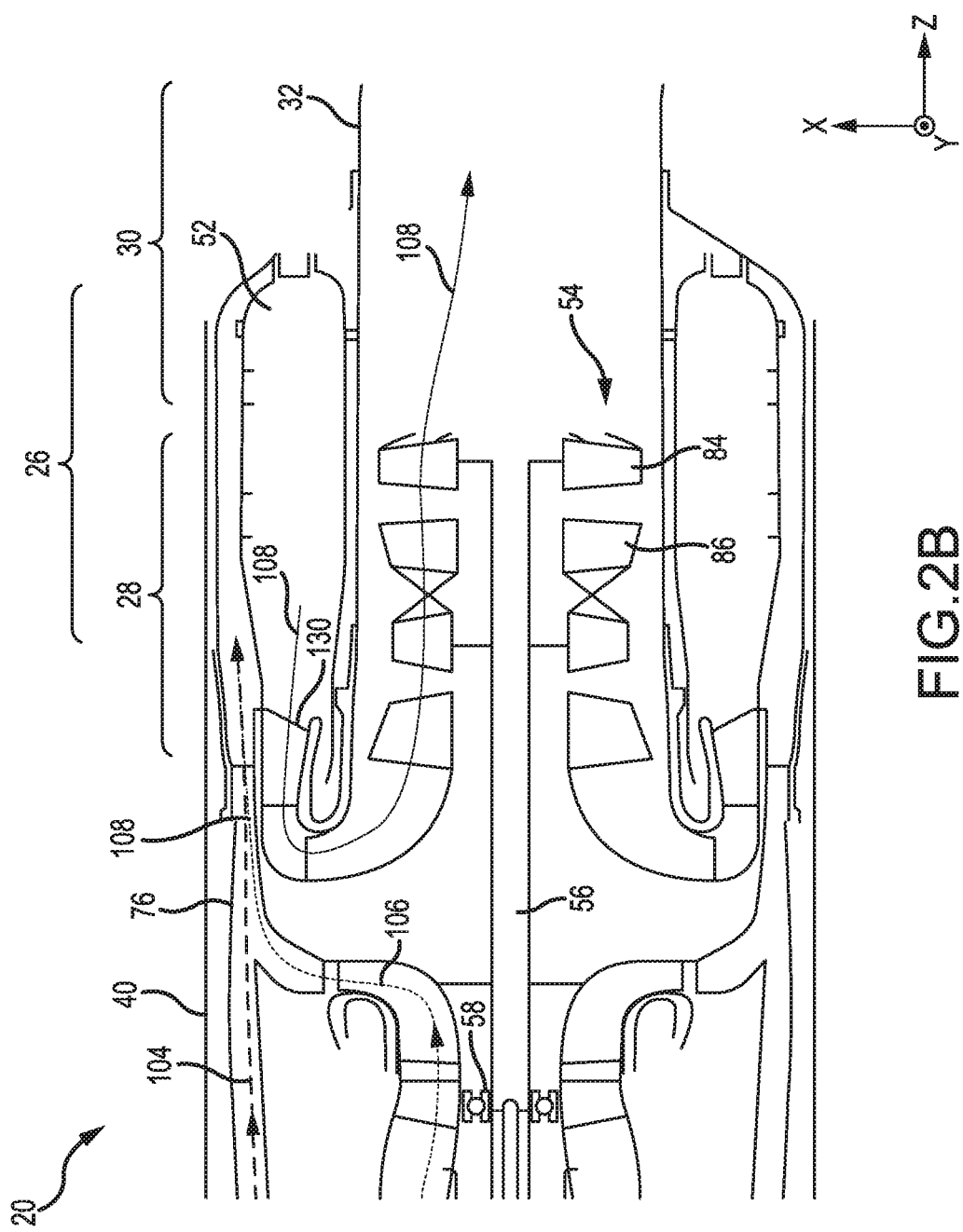
FIG. 2B illustrates an airflow path for an auxiliary power unit, in accordance with various embodiments.

With reference to FIG. 2B, additional detail of an airflow path for turbine 54 for APU 20 is shown, in accordance with various embodiments. Combustor 52 may be in fluid communication with fourth airflow path 108 and with communication with a downstream turbine 54. Combustor 52 may comprise an annular reverse flow combustor. Hot combusted gases of fourth airflow path 108 within combustor 52 may be directed as reverse flow through combustor 52. Fourth airflow path 108 may exit combustor 52 at an axially forward end 130 of combustor 52 and may flow radially inward toward turbine 54, and may subsequently flow into turbine 54. Fourth airflow path 108 may enter turbine 54 as an axial flow, such that fourth airflow path 108 may flow axially in the z direction into turbine 54. Fourth airflow path 108 may enter turbine 54 at an input of turbine 54, which may be at a forward end of turbine 54. In various embodiments, a temperature of fourth airflow path 108 entering turbine 54 may be at temperatures of 2300° F. (1260° C.) or greater, and more specifically, at temperatures of 2400° F. (1316° C.) or greater. In various embodiments, turbine comprises two stages of blades 84 and vanes 86. Fourth airflow path 108 may be directed in an axially aft direction through turbine 54 and may exit through nozzle 32.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An auxiliary power unit, comprising:
   a twin centrifugal compressor comprising:
   a forward centrifugal compressor having a first aft end and a first forward end;
   an aft centrifugal compressor disposed aft of the forward centrifugal compressor, the aft centrifugal compressor having a second aft end and a second forward end;
   a first airflow path at an input of the twin centrifugal compressor;
   a second airflow path defined by the forward centrifugal compressor, wherein the second airflow path is directed forward from the first aft end toward the first forward end;
   a third airflow path defined by the aft centrifugal compressor, wherein the third airflow path is directed aft from the second forward end toward the second aft end;
   a manifold disposed aft of the forward centrifugal compressor and the aft centrifugal compressor, the manifold defining a fourth airflow path, wherein the fourth airflow path is comprised of a mix of the second airflow path and the third airflow path, and wherein the fourth airflow path is co-axial with the second airflow path and the third airflow path; and a combustor comprising an annular reverse flow combustor, wherein the fourth airflow path is further defined by the annular reverse flow combustor.

2. The auxiliary power unit of claim 1, further including a blade, wherein the blade comprises silicon nitride.

3. The auxiliary power unit of claim 1, wherein the second airflow path and the third airflow path are co-axial within the twin centrifugal compressor.

4. The auxiliary power unit of claim 1, wherein a second pressure of the second airflow path is substantially the same as a third pressure of the third airflow path.

5. The auxiliary power unit of claim 1, wherein a pressure ratio of at least one of the second airflow path or the third airflow path to the first airflow path is 7:1 or greater.

6. An auxiliary power unit, comprising:
a forward centrifugal compressor having a first aft end and a first forward end;
an aft centrifugal compressor disposed aft of the forward centrifugal compressor, the aft centrifugal compressor having a second aft end and a second forward end;
a second airflow path defined by the forward centrifugal compressor, wherein the second airflow path is directed forward from the first aft end toward the first forward end;
a third airflow path defined by the aft centrifugal compressor, wherein the third airflow path is directed aft from the second forward end toward the second aft end;
an annular reverse flow combustor disposed aft of the aft centrifugal compressor; and
a turbine disposed radially inward of the annular reverse flow combustor and aft of the aft centrifugal compressor.

7. The auxiliary power unit of claim 6, wherein the forward centrifugal compressor further comprises a blade.

8. The auxiliary power unit of claim 7, wherein the blade includes silicon nitride.

9. The auxiliary power unit of claim 7, wherein a forward diameter of the forward centrifugal compressor is smaller than an aft diameter of the aft centrifugal compressor.

10. The auxiliary power unit of claim 7, further comprising a first airflow path defined between the forward centrifugal compressor and the aft centrifugal compressor, wherein the second airflow path and the third airflow path being split from the first airflow path.

11. The auxiliary power unit of claim 10, wherein the second airflow path and the third-airflow path are co-axial.

12. The auxiliary power unit of claim 11, wherein a second pressure of the second airflow path is substantially the same as a third pressure of the third airflow path.

13. The auxiliary power unit of claim 11, further comprising a manifold, wherein the manifold defines a fourth airflow path, wherein the fourth airflow path is comprised of a mix of the second airflow path and the third airflow path.

14. An auxiliary power unit, comprising:
a twin centrifugal compressor including a first blade;
an engine case structure, wherein the engine case structure and the twin centrifugal compressor define a first airflow path, wherein the twin centrifugal compressor defines a second airflow path and a third airflow path from the first airflow path, wherein the second airflow path is directed forward and the third airflow path is directed aft;
a fourth airflow path comprising a mix of the second airflow path and the third airflow path, the fourth airflow path being co-axial with the second airflow path and the third airflow path;
a combustor comprising an annular reverse flow combustor, wherein the annular reverse flow combustor further defines the fourth airflow path;
a turbine disposed aft of the twin centrifugal compressor and radially inward of the combustor, the turbine including a second blade.

15. The auxiliary power unit of claim 14, wherein the first blade comprises a first material and the second blade comprises a second material and wherein the first material is the same as the second material.

16. The auxiliary power unit of claim 14, wherein the first blade comprises silicon nitride.

17. The auxiliary power unit of claim 14, wherein a diameter of the turbine is between 10 centimeters (3.94 inches) to 18 centimeters (7.09 inches).

* * * * *